United States Patent [19]
Shifrin

[11] Patent Number: 4,966,456
[45] Date of Patent: Oct. 30, 1990

[54] SPECTRAL ANALYZER AND DIRECTION INDICATOR AND AIRCRAFT LANDING SYSTEM APPLICATION

[75] Inventor: Gordon A. Shifrin, Malibu, Calif.

[73] Assignee: Hughes Aircraft Company, Los Angeles, Calif.

[21] Appl. No.: 374,206

[22] Filed: Jun. 30, 1989

Related U.S. Application Data

[62] Division of Ser. No. 737,114, May 23, 1985.

[51] Int. Cl.$^5$ .......................... G01J 3/36; G01B 11/26
[52] U.S. Cl. ...................................... 356/73; 356/141; 356/328
[58] Field of Search .......................... 356/73, 141, 328; 250/226

[56] References Cited

U.S. PATENT DOCUMENTS

| | | | |
|---|---|---|---|
| 3,761,184 | 9/1973 | McLaughlin, Jr. | 356/416 |
| 3,824,018 | 7/1974 | Crane, Jr. | 356/112 |
| 3,858,201 | 12/1974 | Foster | 340/347 P |
| 3,929,398 | 12/1975 | Bates | 250/226 |
| 3,992,099 | 11/1976 | Laughlin | 356/73 |
| 4,037,959 | 7/1977 | Bumgardner | 356/73 |
| 4,147,424 | 4/1979 | Foster et al. | 356/352 |
| 4,170,416 | 10/1979 | Fencil | 356/346 |
| 4,183,669 | 1/1980 | Doyle | 356/346 |
| 4,185,919 | 1/1980 | Williamson et al. | 356/141 |
| 4,309,108 | 1/1982 | Siebert | 356/352 |
| 4,624,566 | 11/1986 | Shifrin et al. | 356/73 |
| 4,674,871 | 6/1987 | Shifrin | 356/73 |
| 4,682,888 | 7/1987 | Welner | 356/73 |

*Primary Examiner*—F. L. Evans
*Attorney, Agent, or Firm*—William J. Streeter; Wanda K. Denson-Low

[57] ABSTRACT

A spectral analyzer and direction indicator system (10) is disclosed and includes optical channels (20,30,40) for providing detected optical information indicative of incidence direction and spectral content of incident radiation. Each optical channel includes a reflector element (11,17,23) having a non-ruled section (11a,17a,23a) and a spectrally dispersing ruled section (11b,17b,23b); an analytical optical system (13,19,25); and a detector array (15,21,27). For each reflector element the non-ruled section is tilted in one or two directions relative to the ruled section. The disclosed spectral analyzer and direction indicator system is advantageously utilized as an aircraft based sensor in an aircraft landing system having ground lasers (29L,29R,33L,33R,37L,37R) directed into the landing approach path.

12 Claims, 4 Drawing Sheets

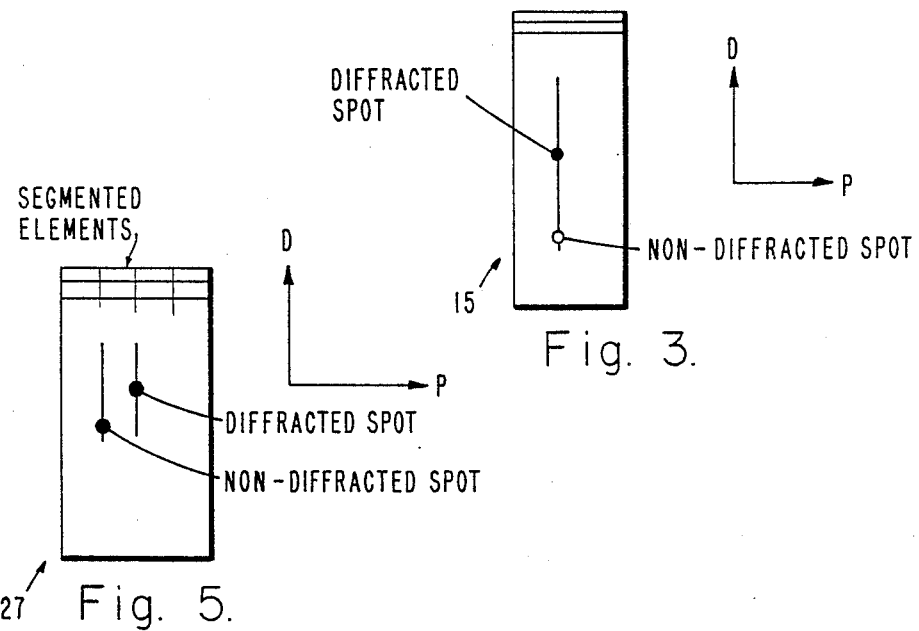
Fig. 3.
Fig. 5.
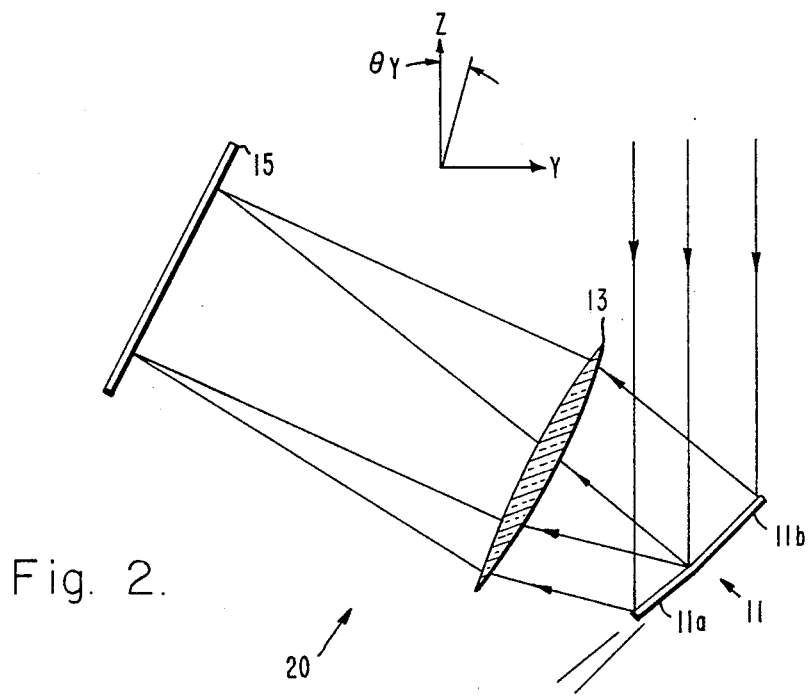
Fig. 2.

SPECTRAL ANALYZER AND DIRECTION INDICATOR AND AIRCRAFT LANDING SYSTEM APPLICATION

This is a division of Ser. No. 06/737,114 filed 23 May 1985.

BACKGROUND OF THE INVENTION

1. Field of the Invention

The disclosed invention generally relates to apparatus for detecting essentially collimated radiation, measuring wavelength values within that radiation, determining the direction to the source of that radiation within an extended field-of-view, and observes the coherence length of sources so as to discriminate between essentially coherent (e.g., laser) and non-coherent radiation, all of which is accomplished simultaneously and in staring fashion (i.e., without scanning).

2. Background Art

The prior art includes a variety of devices for detecting coherent radiation. Examples of such prior art devices are discussed below.

U.S. Pat. No. 3,824,018, issued to Crane, Jr., discloses an unequal path interferometer. The interferometer scans so as to cause a change in the difference in the two optical paths which will modulate the intensity of the recombined coherent radiation by varying interference effects.

U.S. Pat. No. 4,147,424, issued to Foster, et al., discloses a system for detecting the presence of coherent radiation having an interference filter with a pair of partially reflective mirrors, with the spacing between the mirrors being varied sinusoidally to change the transmission wavelength of the mirrors. The output is compared to an established reference signal to produce an identifying indication of the detected radiation.

U.S. Pat. No. 4,170,416 discloses apparatus for detecting the presence of coherent radiation in the presence of incoherent ambient radiation, and for determining the intensity, the wavelength, or the threshold direction of such coherent radiation. The apparatus includes a Fabry Perot etalon having three regions of different thickness.

U.S. Pat. No. 4,183,669, issued to Doyle, and U.S. Pat. No. 4,185,919, issued to Williamson et al., discloses a quadrant detection system using an objective lens and a holographic lens. The holographic lens has lens elements in four quadrants with each quadrant having a focal point corresponding to the position of adjacent photoelectric detectors.

U.S. Pat. No. 3,858,201, issued to Foster, discloses a system for determining a direction from which an illuminating laser beam is received. The system includes a cylindrical optical system for focusing a laser beam as a sharp line image.

U.S. Pat. No. 4,309,108, issued to Siebert, discloses an analyzer for coherent radiation for discriminating wavelength from a single pulse or from a continuous wave radiation and to determine the relative angular position of the source of the radiation. The analyzer includes at least three unequal length path interferometers and detectors for detecting the radiation transmitted through the interferometers.

The foregoing prior art devices are generally complex, relying to a large extent on classical electro-optical techniques and/or the use of scanning.

While the prior art devices exhibit various combinations of features for measuring characteristics of radiation, none, however, has the versatility or all of the particular and extensive features of the disclosed invention combined into a single instrument without the need to scan.

SUMMARY OF THE INVENTION

It is, therefore, an object of this invention to provide a spectral analyzer and direction indicator that without resorting to scanning detects essentially collimated radiation, and with respect to that radiation, simultaneously measures quantities that uniquely determine (1) its wavelength values within an extended spectral band, (2) its direction within an extended field-of-view, and (3) its coherence length so as to discriminate between radiation that is coherent or essentially coherent and non-coherent. The principle of operation for the disclosed invention applies equally well in any spectral region (e.g., from ultraviolet to microwave) for which there exist suitable dispersive and detecting elements.

It is also an object of the present invention to provide an efficient spectral analyzer and direction indicator responsive to essentially collimated radiation.

Another object of the invention is to provide a rugged and versatile spectral analyzer and direction indicator responsive to essentially collimated radiation.

Still another object of the invention is to provide a spectral analyzer and direction indicator responsive to radiation that is either essentially coherent (e.g., laser) or non-coherent.

A further object of the invention is to provide a non-scanning spectral analyzer and direction indicator that detects essentially collimated radiation, discriminates between radiation that is essentially coherent (e.g. laser) and non-coherent (i.e., spectrally broad), and that locates the direction within a specified but extended field-of-view from which that radiation is received.

An additional object of this invention is to provide a staring spectral analyzer and direction indicator that measures wavelength values contained within the detected radiation, which can be either coherent or non-coherent, and that can occur anywhere within a specified but extended spectral interval.

Still a further object of the invention is to provide a spectral analyzer and direction indicator responsive to collimated or essentially collimated radiation and capable of discriminating a plurality of sources.

A still further object of the invention is to provide a spectral analyzer and direction indicator that is rugged enough to be readily utilized in vehicles.

Another object of the invention is to provide a spectral analyzer and direction indicator which has reduced internal field of view requirements.

Still another object of the invention is to provide an aircraft landing system which utilizes ground based lasers as reference beams for an aircraft-based spectral analyzer and direction indicator.

The foregoing and other objects of the invention are accomplished in a spectral analyzer and direction indicator system which includes one or more optical channels wherein each channel includes a reflector element having two separate sections for respectively providing diffracted and non-diffracted optical information, and each channel further includes an analytical optical system for appropriately focusing the optical information and detector apparatus for detecting the optical information. The detected information is utilized to determine spectral content and incidence direction of incident radiation. In one embodiment, the reflector element sections are angled or tilted relative to each other so as to intersect along a first line. In a further embodiment, one or both of the reflector element sections are further tilted about a line perpendicular to the first line.

In the aircraft landing system, ground based lasers adjacent a runway are appropriately aimed for detection by an aircraft-based spectral analyzer and direction indicator system, such as the system disclosed herein.

BRIEF DESCRIPTION OF THE DRAWINGS

The advantages and features of the disclosed invention will readily be appreciated by persons skilled in the art from the following detailed description when read in conjunction with the drawing wherein:

FIG. 2 is an elevational schematic view illustrating an optical channel of the disclosed spectral analyzer and direction indicator system of FIG. 1.

FIG. 3 is a schematic of a detector array as utilized in the spectral analyzer and direction indicator of FIG. 1, and illustrates relative locations of the optical information focused on such detector array.

FIG. 5 is a schematic of a detector array as used in the optical channel of FIG. 4 and illustrates relative locations of the optical information focused on such detector array.

FIGS. 9a through 9e illustrate a sequence of graphical displays provided to an aircraft pilot by the disclosed aircraft landing system.

DETAILED DESCRIPTION

Figure 1:
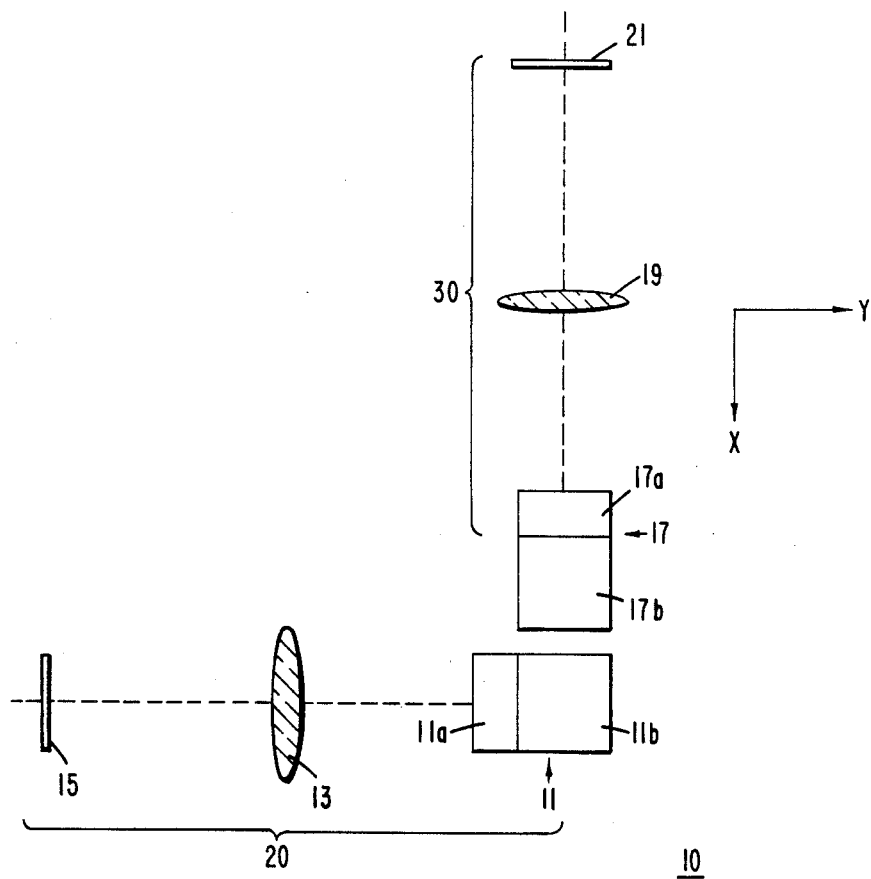
FIG. 1 is a top plan schematic view illustrating the disclosed spectral analyzer and direction indicator system.

In the following detailed description and in the several figures of the drawing, like elements are identified with like reference numerals.

While the disclosed invention is useful with different wavelengths of essentially collimated radiation (e.g., from ultraviolet to microwave), the disclosed systems will be primarily described relative to spectrally narrow (e.g., laser) radiation and for wavelengths typical of the visible and infrared regions. This will facilitate the understanding of the principles involved which can then be applied to other sources of radiation.

For reference purposes, the following spectral analyzer and direction indicator systems are discussed relative to a three dimensional right-handed Cartesian coordinate system and directional angles measured relative to the Cartesian coordinate system. In FIG. 1, which is a top plan view, the x and y axes are shown while the z-axis is understood to be orthogonal to the x and y axes and having a positive direction out of the plane of the figure. In the elevational view of FIG. 2, the y and z axes are shown, while the x-axis is understood to be orthogonal. In the perspective view of FIG. 4, the x, y and z axes are shown.

Figure 4:
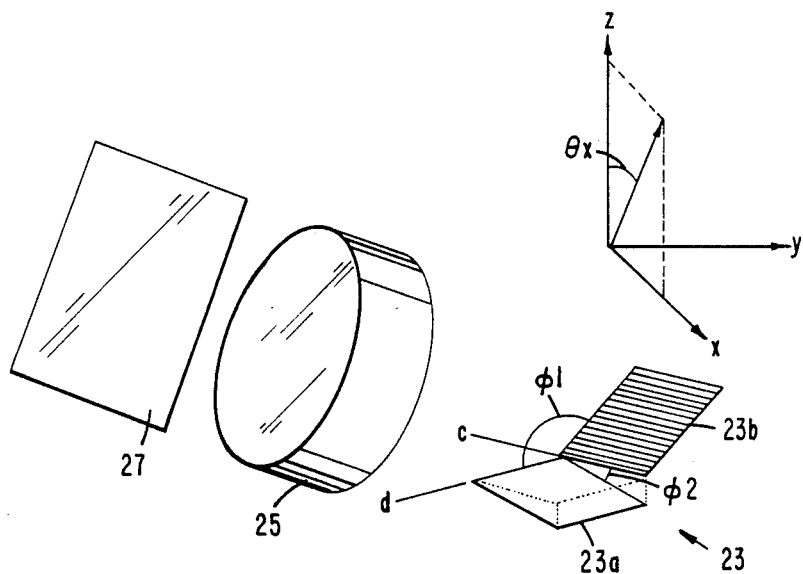
FIG. 4 is a perspective view of a further embodiment of an optical channel for use in the disclosed spectral analyzer and direction indicator system.

As references for incidence direction, the angles $\theta x$ and $\theta y$, are provided, whereby $\theta x$ is measured in the xz plane, and $\theta y$ is measured in the yz plane. FIG. 2 illustrates the measurement of $\theta y$ relative to the z-axis and FIG. 4 illustrates the measurement of $\theta x$ relative to the z-axis.

The z-axis can be considered as being along the center line (line of sight) of the external field of view (FOV), which refers to the field of view over which a spectral analyzer and direction indicator can receive incident radiation. In other words, external FOV refers to the section of space which a spectral analyzer and direction indicator can observe. Internal field of view (FOV) in the disclosure generally refers to the field of view of one or more of the optical components within a spectral analyzer and direction indicator. Such optical components include reflectors, lenses, and detector arrays.

The spectral analyzer and direction indicator system 10 shown in the top plan view of FIG. 1 includes a first reflector element 11 having a non-ruled section 11a and a ruled section 11b, wherein the rulings are parallel to the x-axis. An analytical optical system 13, shown as a simple lens, focuses the essentially collimated reflected radiation on to a linear detector array 15. The detector array 15 has parallel elongated detector elements which are parallel to the x-axis. The elongated elements in detector arrays 15 and 21 in FIG. 1 are arranged parallel to the plane of the figure and thus resolve relative to a direction that is out of the plane of the figure but not necessarily along the z-axis. If the elements are segmented, some resolution will be obtained along the x-axis for the detector array 15, and along the y-axis for the detector array 21.

In FIG. 1, the reflector element 11, the analytical optical system 13, and the detector array 15 will be referred to herein as an optical channel 20. As will be discussed more fully below, the position of the non-diffracted reflected image on detector array 15 for optical channel 20 (nominally parallel to the y-axis) is indicative of the $\theta y$ direction. The position of the diffracted image detected by the detector array 15 along the y-axis is indicative of the angle of diffraction resulting from the ruled reflector section 11b. The positions of both the diffracted and undiffracted images on the detector array 15 along the x-axis represent the $\theta x$ component of the incidence direction. This $\theta x$ component will be detected in this optical channel but will be resolved only to the extent permitted by any segmentation of the detector elements.

In FIG. 1, the reflector element 17, the associated analytical optical system 19, and the detector array 21 are referred to herein as an optical channel 30. The spectral analyzer and direction indicator 10 of FIG. 1 further includes a second reflector element 17, which has a non-ruled section 17a and a ruled section 17b wherein the rulings are parallel to the y-axis. A second analytical optical system 19, shown as a simple lens, focuses the reflected radiation on to a linear detector array 21. The detector array 21 has parallel elongated detector elements which are parallel to the y-axis. The position of the undiffracted image detected by the detector array 21 along the x-axis is indicative of the $\theta x$ direction of the incident radiation, as well as the angle of incidence relative to the ruled reflector section 17b. The position of the diffracted image detected by the detector array 21 along the x-axis is indicative of the angle of diffraction resulting from the ruled section 17b. The positions of both the diffracted and undiffracted images on the detector array 21 for the optical channel 30 (nominally parallel to the y-axis) represent the θy component of the incidence direction. This θy component will be detected in this optical channel, but it will be resolved only to the extent permitted by any segmentation of the detector elements.

The component of the angle of incidence parallel to the rulings on ruled section 11b or 17b is not diffracted. This component of the incidence angle is affected in the same manner as it would be if the ruled sections were unruled (i.e., a plane mirror). Since the disclosed spectral analyzer and direction indicator is a two-axis system, both analytical optical channels and their associated detector arrays must have sufficient angular subtense (i.e., internal FOV) to accommodate all angular and linear excursions of interest in both axes.

As indicated in FIG. 1, the optical channels are at right angles to each other. Such orientation allows for a straightforward determination of the incidence direction angles θx and θy.

Referring to the elevational view of FIG. 2, shown therein is the optical channel 20. As shown, the reflector sections 11a and 11b are planar and are angled relative to each other so that their respective planes intersect along a line parallel to the x-axis and parallel to the rulings on the ruled reflector section 11b. As measured from the incident surfaces of the reflector sections 11a and 11b, the angle formed is less than 180 degrees. The angled relationship between the reflector sections 11a and 11b is such that no interchange of relative position of the two images occurs. The angled relationship further results in reduced requirements for internal FOV in the analytical optical system 13 and for angular subtense in the detector array 15 in the direction of change indicated by θy, which lies in the y-z plane of diffraction from the ruled reflector section 11b.

The elongated detector elements in detector array 15 of FIG. 2 are arranged at right angles to the plane of the figure. Thus, they resolve in a direction along the length of the array as shown in the figure. If the detector elements are segmented, some resolution will be obtained in the direction at right angles to the plane of the figure.

The optical channel 30, including the reflector 17, the analytical optical system 19, and the detector array 21, is arranged similarly to the optical channel shown in FIG. 2. The angled relationship between the non-ruled section 17a and the ruled section 17b results in reduced requirements for internal FOV in the analytical optical system 19 and for angular subtense in the detector array 21 in the direction of change indicated by θx, which lies in the x-z plane of diffraction from the ruled reflector section 17b.

The relative areas of the ruled and unruled sections of reflectors 11 and 17 can be adjusted to correct for different reflectances. For example, if the reflective efficiency of the ruled section (e.g., a diffraction grating) 11b is less than that of the non-ruled section (e.g., a plane mirror), then the area of the ruled section can be made correspondingly larger so as to intercept a greater portion of the incident energy. The relative areas of the these sections can be made, for example, inversely proportional to reflectance. In this manner, the total radiated power incident on the reflectors is shared in such a way that the resulting signal to noise ratios for the two images will be as well matched as possible.

Referring now to FIG. 3, shown therein is a schematic of the incident side of the detector array 15 shown in FIGS. 1 and 2. The D axis identifies the direction of diffraction caused by the ruled reflector section 11b. The D axis also identifies the direction of change relative to changes in the incidence direction θy. Displacements along the P axis represent the component of the angle of incidence at right angles to that resolved by the particular optical channel (i.e., parallel to the rulings on the ruled section). The two optical channels in combination resolve both components of the angle of incidence, but each channel must have sufficient angular subtense (i.e., internal FOV) along both coordinate axes to detect all image positions of interest.

The detector array 21 is substantially similar to the detector array 15, but because optical channel 20 and optical channel 30 are arranged at right angles to each other, the elongated elements of array 21 are parallel to the y-axis. The detector array 21 detects and resolves image position in the direction of diffraction caused by the ruled reflector section 17b, and also in the direction of change in the incidence direction θx.

As is well known, the ruled reflector sections 11b and 17b will reflect incident radiation at angles which depend on both spectral content and incidence direction. The following will describe the determination of spectral content for information from the ruled reflector section 11b, and is also applicable to the ruled reflector section 17b.

Rays for both incidence angle I and diffraction angle D are measured relative to the normal to the ruled reflector sections 11b or 17b. The convention for both of these angles is that rays on opposite sides of the normal have opposite algebraic signs. The grating equation below relates one component of the angle of incidence (the component normal to the rulings) to the angle of diffraction:

$$\sin D = \frac{nW}{d} - \sin I \qquad \text{(Equation 1)}$$

The symbols represent the following values:

TABLE I

I: angle of incidence
D: angle of diffraction
W: wavelength
n: order of diffraction
d: spacing of adjacent rulings on ruled reflector section Solving Equation 1 for wavelength W provides the following:

$$W = \frac{d}{n} [\sin D + \sin I] \qquad \text{(Equation 2)}$$

The wavelengths of the spectral component of the incident radiation are, therefore, determined by the detector positions of the non-diffracted and diffracted images. The location of the diffracted image on the linear detector array 15 will depend on several characteristics of the incident radiation. In addition to the dependence on wavelength and direction as described above, to the extent that the incident radiation is collimated, the radiation diffracted from the grating also will be collimated. For a spectrally narrow source (e.g., a laser), a focused spot is produced on the detector array 15. The location of the focused spot on the detector array provides a measure of the angle of diffraction D.

For a point source that is spectrally broad, the diffracted image on the detector array 15 will not be a single focused spot but will be an image that occupies an angular interval along the array whose extent is determined by the spectral content of the source. Each illuminated detector element subtends and corresponds to a small range of angles of diffraction from the associated grating, and the output level of the detector element represents the amplitude of a portion of the spectrum. Thus, both the spectral signature of the point source and its angular position within the FOV can be determined when the information provided by the illuminated detector elements is suitably interpreted.

An expression for coherence length L is:

$$L = \frac{W^2}{\pi \Delta W} \quad \text{(Equation 3)}$$

where $\Delta W$ is the spectral bandwidth in the radiation. Since the spectral analyzer and direction indicator can yield values for both wavelength and spectral bandwidth, coherence length can be obtained from measured quantities to within an upper limit set by the spectral resolution of any particular instrument.

The location of the image from the non-ruled section 11a (undiffracted image) on detector array 15 will be a function of both coordinate components of the angle of incidence. The $\theta y$ component will be detected and resolved. The $\theta x$ component will be detected, but will be resolved only to the extent permitted by any segmentation of the elongated detector elements. Therefore, the location of the non-undiffracted image provides information as to the angle of incidence I, since the smooth reflector portion 11a remains at a known fixed angle relative to the ruled reflector section 11b.

The detected locations on the detector array 15 of the non-diffracted and diffracted images are appropriately processed for determining wavelength W in accordance with Equation 2. Also, the location of the detected non-diffracted image is indicative of the incidence direction $\theta y$.

The foregoing analysis is also utilized with respect to the non-diffracted and diffracted images detected on the detector array 21. The locations of such images are appropriately processed to determine wavelength W and the incidence direction $\theta x$.

The performance of the optical channel 20 can best be understood further with reference to the images focused on to the detector array 15. Shown in FIG. 3 are two spots corresponding to the non-diffracted and diffracted images of a spectrally narrow source (e.g., a laser) observed by the optical channel 20. The two spots define a line which is parallel to the D axis which identifies the direction of diffraction. For all such observed sources, the two spots will always form a line parallel to the D axis. This line will move in response to changes in the $\theta x$ incidence angle. A similar line of two images on detector array 21 will move parallel to itself in response to changes in the $\theta y$ axis. The distance separating the spots will be a function of both wavelength and the incidence direction $\theta y$. In order to avoid confusion, the included angle between the reflector sections 11a and 11b is appropriately determined so that the relative positions of the two images will never interchange. Thus, the two spots will always be identifiable for the spectral range of interest and all directions within the external FOV. Specifically, the minimum distance between the non-diffracted and diffracted spots must always be at least three detector elements along the D axis. Thus, there is a lower limit for the internal FOV that can be achieved for the optical channels 20 and 30, and accordingly so for the detector arrays 15 and 21.

Referring now to FIG. 4, shown therein is a modification of the optical channel 20 shown in FIG. 2. Specifically, shown in FIG. 4 is an optical channel 40 oriented similarly to the optical channel 20 and which includes a reflector element 23, an analytical optical system 25, shown as a simple disk, and a detector array 27. The reflector element 23 includes a smooth non-diffracting section 23a and a ruled reflector section 23b, wherein the rulings are parallel to the x-axis. As shown, the smooth reflector section 23a is tilted along two angular axes relative to the ruled diffracting section 23b. First, the reflector section 23a is tilted about an axis c which is parallel to the rulings on the ruled reflector section 23b. That tilt provides an included angle $\phi 1$ which is measured in a plane parallel to the yz plane. The reflector section 23a is further tilted about an axis d which is perpendicular to the axis c and is in the plane of the reflector section 23a. The rotation about the d-axis is at an angle $\phi 2$ which is measured in a plane parallel to the xz plane.

The optical channel 40 achieves reduced requirements for internal FOV in the analytical optical system 25 and for angular subtense in the detector array 27 along one axis. FIG. 5 is a schematic representation of the incident side of the detector array 27. The angular subtense as illustrated in FIG. 5 is reduced in a direction parallel to the D axis. By way of example, for a spectrally narrow source (e.g., a laser) two spots will be imaged on the array 27, and the diffracted spot will always be imaged to the right of the non-diffracted spot. The vertical lines through the spots in FIG. 5 illustrate typical paths along which simultaneous displacements parallel to the D axis will occur. For displacements parallel to the P axis, the horizontal separation between the spots will remain essentially the same. Therefore, there is no requirement that the spot positions never overlap in a direction parallel to the D axis. To assure unambiguous identification of the spots under these operating conditions, the elements of the detector array must be segmented in a direction parallel to the P axis. Minimum separation of the spots in the P direction must be three detector segments. Representative segmentation of the otherwise elongated elements is illustrated in FIG. 5.

As a trade-off for reducing the internal FOV along the D axis, which is the largest, the internal FOV along the P axis must be increased because of the requirement of separating the spots along P axis. However, it has been determined that substantial optical advantage for the optical system 25 results from reducing the largest internal FOV, which is along the D axis.

For a two-axis spectral analyzer and direction indicator system, an additional optical channel similar to the optical channel 40 would be utilized at right angles to the optical channel 40.

The foregoing described spectral analyzer and direction indicator can observe both direction and wavelength of a radiation source in staring fashion over a substantial internal FOV (e.g., ten (10) to twenty (20) degrees) and spectral bandpass (e.g., one octave). The external FOV of any optical system in which a spectral analyzer and direction indicator is placed will be determined independently by any foregoing optics. Such optics must provide the essentially collimated radiation required by the reflecting sections (e.g., 11a and 11b in FIG. 1). Such external optics, for example, might consist of a telescope, in which case the external FOV would be less than the internal. In exchange for this reduced FOV, however, considerable light gathering ability is gained. The reflecting sections themselves can function as the collecting optical elements for the remainder of the system, however, in which case the internal and external FOVs would be identical.

The disclosed spectral analyzer and direction indicator is advantageously utilized as an aircraft based sensor of an aircraft landing system which further includes ground based laser sources.

Figure 6:
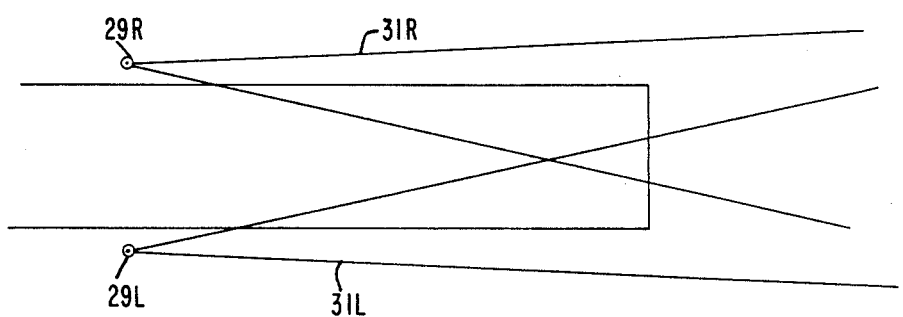
FIG. 6 is a top plan view illustrating the locations of a pair of lasers adjacent a runway in accordance with the aircraft landing system of the invention.

FIG. 6 illustrates in plan view a pair of lasers 29L and 29R which radiate respective beams 31L and 31R into the landing approach flight path. Upon entering the region of overlap of the beams 31L and 31R, an aircraft with a spectral analyzer and direction indicator, such as disclosed above, will have on-board information instantaneously indicative of position relative to the runway.

Specifically, the following functions can be performed within the aircraft: (1) verification of the laser signals as being the proper sources; (2) determination of relative heading in both azimuth and elevation with respect to the aircraft's own coordinate system; and (3) determination of range to the runway.

Verification of the signals consists of assuring that the sources are lasers of the proper wavelength and not sources that are bright and spectrally broad that also contain the laser wavelength. A narrow bandpass filter can be introduced that spectrally is slightly wider than the bandwidth of the laser radiation. The bandwidth can be selected such that under all conditions at least one additional detector element of the spectral analyzer and direction indicator is illuminated with a broad source than is illuminated with a laser source. If the filter is too wide, needless background radiation noise is introduced. Pulse coding also could be included in the laser signal. Relative heading is observed by noting the apparent position within the FOV of the centroid of both laser sources as a group. Range is computed by using the apparent angular separation of the sources. All of these observations can be made directly with the disclosed spectral analyzer and direction indicator system.

Figure 7:
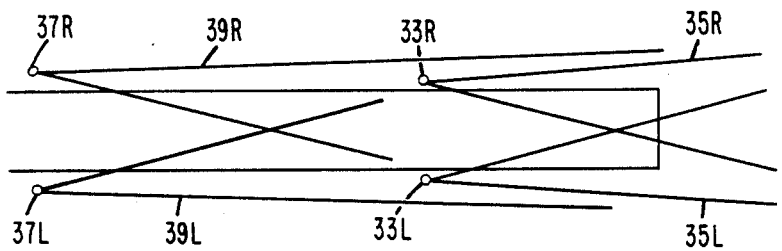
FIG. 7 is a top plan view illustrating the locations of a pair of lasers adjacent a runway in accordance with the aircraft landing system of the invention.

FIG. 7 illustrates in plan view two pairs of lasers which radiate respective beams into the flight path. Specifically, a forward pair of lasers 33L and 33R radiate respective beams 35L and 35R. The forward lasers 33L and 33R are oriented substantially the same as the lasers 31L and 31R in FIG. 6. An aft pair of lasers 37L and 37R radiate respective beams 39L and 39R.

The use of the additional aft lasers 37L and 37R allows for the determination of the following additional information: (1) indication of the location of an aircraft in later stages of landing when it is beyond the working region of the forward lasers 33L and 33R; and (2) indication of the elevation approach angle of the aircraft relative to the runway.

The beam configuration of the aft lasers 37L and 37R is substantially the same as for the forward lasers 33L and 33R. However, different beam patterns and power levels may be appropriate for the aft lasers 37L and 37R because of the shorter range over which they are utilized, the possibly slower aircraft speed occurring when they are in view from the aircraft, and the more restricted volume of probable positions of the aircraft when the aft lasers 37L and 37R are in view. For improved performance, additional sets of lasers could be added at other points on the runway. Indeed, many other laser patterns could be suggested that are well within the general concept of this invention.

Figure 8:
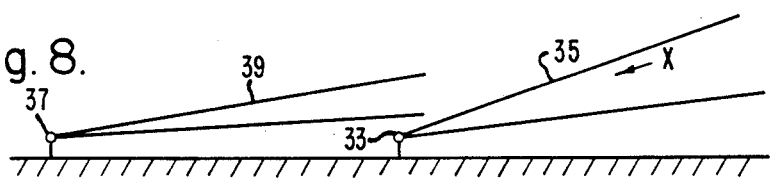
FIG. 8 is a side elevation view illustrating the elevation directions of the laser beams provided by the lasers shown in FIG. 6.

FIG. 8 shows the forward and aft lasers of FIG. 7 in an elevation view. The laser beams are shown radiating from towers above the level of the runway. The lasers are directed at different angles and have different beam widths. A typical instantaneous position of the aircraft is indicated by the symbol "X." The elevation approach angle relative to the runway can be measured because, as can be concluded from FIG. 8, the apparent vertical separation of the two sets of sources can be observed from the aircraft If the actual heading of the aircraft differs significantly from the direction of its path, the on board spectral analyzer and direction indicator can be rotated so as to bring the beam patterns within its FOV.

FIGS. 9a through 9e schematically illustrate graphic displays which may be provided to the aircraft pilot on the basis of the information detected by the on board spectral analyzer and direction indicator. FIGS. 9a through 9e are based on a landing system having two pairs of lasers nominally as shown in FIGS. 7 and 8. Such graphic displays are intended to be representative of the scene as would be observed by the pilot and as provided by the spectral analyzer and direction indicator.

FIGS. 9a through 9e specifically illustrate a sequence of displays indicative of the particular positions of an aircraft relative to the runway as it approaches the runway. FIG. 9a shows initial detection of the laser sources, and FIG. 9b shows detection of the separate forward lasers. FIG. 9c shows detection of the aft lasers in addition to the forward lasers. FIG. 9d shows detection of all four lasers at shorter range than for FIG. 9c. FIG. 9e shows detection of only the aft lasers when the aircraft is beyond the forward lasers.

When all four lasers are detected and distinguishable (FIG. 9c and 9d) the graphical display shows a pattern of four spots. The lower pair of spots on the display, which will always be more widely separated, correspond to the forward lasers, while the upper pair of spots correspond to the aft lasers.

The display of the four spots allows for determination of range and elevation angle. Range to the runway is computed by using the apparent horizontal separation of the pairs of dots. Elevation angle with respect to the runway is indicated by the vertical separation between the matched pairs of dots. Azimuth and elevation with respect to the aircraft coordinate system are indicated respectively by the horizontal and vertical position of the centroid of the dot pattern. These patterns are produced directly from the output of the spectral analyzer and direction indicator. While it is not basically an imaging device, the disclosed spectral analyzer and direction indicator in combination with the disclosed system of laser beams can generate information to produce this graphic display, which can be interpreted easily by the pilot and which is almost a pictorial image.

The effective range of such a landing system could extend out to several kilometers with possibly only a few watts of output power from each laser, depending on conditions for optical transmission. One advantage of this system is that aircraft locations relative to the runway can be obtained with radio silence. This feature could be valuable for an aircraft landing system on a Navy aircraft carrier, for example. If a long wavelength laser (such as $CO_2$) is used, then a degree of fog penetration is obtained. Eye safety is an important consideration, and where there is a significant health risk, radiated power levels must be reduced appropriately, and/or wavelength must be restricted to an eye-safe spectral region. Typical windshield materials will block radiation from $CO_2$ lasers. As an additional safety feature, lasers could be appropriately mounted on towers.

Another advantage of the disclosed landing system is that the pilot can control the aircraft and guide it to a safe landing using reliable information available to him in the cockpit; he is not dependent on other individuals at some remote location. The laser installation proposed for the runway is neither particularly expensive to install nor obtrusive to the normal operation of the runway. On the aircraft itself, the spectral disclosed analyzer and direction indicator is small and light.

Although the foregoing has been a description and illustration of specific embodiments of the invention, various modifications and changes thereto can be made by persons skilled in the art without departing from the scope and spirit of the invention as defined by the following claims.

What is claimed is:

1. A spectral analyzer and direction indicator system for receiving collimated or essentially collimated incident radiation comprising:
   first optical means responsive to the collimated or essentially collimated incident radiation for providing non-dispersed optical information indicative of incidence direction and for providing spectrally dispersed optical information;
   first detector means responsive to said non-dispersed optical information and said dispersed optical information from said first optical means for providing detected information for identifying as to the collimated or essentially collimated incident radiation a first angular incidence direction and the spectral content;
   second optical means responsive to the collimated or essentially collimated incident radiation for providing non-dispersed optical information indicative of incidence direction of the incident radiation and for providing spectrally dispersed optical information; and
   second detector means responsive to said non-dispersed optical information and said dispersed optical information from said second optical means for providing detected information for identifying as to the collimated or essentially collimated incident radiation a second angular incidence direction and the spectral content.

2. The spectral analyzer and direction indicator of claim 1 wherein said first and second optical means each comprises a reflector having a ruled planar section and a smooth non-ruled planar section tilted relative to said ruled planar section.

3. The spectral analyzer and direction indicator of claim 2 wherein said smooth non-ruled planar section is tilted about a first axis parallel to the rulings on said ruled planar section.

4. The spectral analyzer and direction indicator of claim 3 wherein said smooth non-ruled planar section is further tilted about a second axis perpendicular to said first axis.

5. The spectral analyzer and direction indicator of claim 2 wherein the relative effective areas of the ruled and non-ruled sections of said first and second optical means are different from each other so as to intercept unequal fractions of the total incident radiation.

6. The spectral analyzer and direction indicator of claim 2 wherein the relative effective areas of the ruled and non-ruled sections of said first and second optical means are inversely proportional to their reflective efficiencies.

7. The spectral analyzer and direction indicator of claim 1 wherein said first optical means and said first detector means comprise a first optical channel, and wherein said second optical means and said second detector means comprise a second optical channel, said first and second optical channels being at right angles.

8. A spectral analyzer and direction indicator for receiving collimated or essentially collimated incident radiation comprising:
   two nominally identical independent optical channels having respective axes which are at right angles;
   each of said channels having (i) optical means responsive to the collimated or essentially collimated incident radiation for providing radiation containing dispersed optical information and non-dispersed optical information, (ii) analytical optical means for focusing the radiation containing dispersed and non-dispersed optical information, and (iii) detection means responsive to the focused radiation for providing detected information;
   said detected information from each channel independently yielding as to the collimated or essentially collimated incident radiation the spectral content and an incidence direction associated with such channel.

9. The spectral analyzer and direction indicator of claim 8 wherein said optical means comprises a reflector having a ruled planar section and a smooth non-ruled planar section tilted relative to said ruled planar section.

10. The spectral analyzer and direction indicator of claim 9 wherein the relative effective areas of the ruled and non-ruled sections of said first and second optical means are different from each other so as to intercept unequal fractions of the total incident radiation.

11. The spectral analyzer and direction indicator of claim 9 wherein the relative effective areas of the ruled and non-ruled sections are inversely proportional to their reflective efficiencies.

12. The spectral analyzer and direction indicator of claim 8 wherein said detection means comprises a linear detector array.

* * * * *